United States Patent [19]
Stann et al.

[11] Patent Number: 5,608,514
[45] Date of Patent: Mar. 4, 1997

[54] HIGH RANGE RESOLUTION LADAR

[75] Inventors: Barry L. Stann, Silver Spring; William C. Ruff, Baltimore; Zoltan G. Sztankay, Rockville, all of Md.

[73] Assignee: The United States of America as represented by the Secretary of the Army, Washington, D.C.

[21] Appl. No.: 424,949

[22] Filed: Apr. 19, 1995

[51] Int. Cl.$^6$ ............................. G01C 3/08; G01S 13/08
[52] U.S. Cl. ..................... 356/5.09; 342/128; 342/159; 356/5.12; 356/5.13
[58] Field of Search ................... 356/5.09, 5.12, 356/5.13; 342/128, 159

[56] References Cited

U.S. PATENT DOCUMENTS

| | | |
|---|---|---|
| 3,495,087 | 2/1970 | Starer . |
| 3,733,129 | 5/1973 | Bridges . |
| 3,761,614 | 9/1973 | Bradley . |
| 3,866,052 | 2/1975 | DiMatteo et al. . |
| 4,064,511 | 12/1977 | Manfanovsky . |
| 4,199,253 | 4/1980 | Ross . |
| 4,259,017 | 3/1981 | Ross et al. . |
| 4,403,857 | 9/1983 | Holscher . |
| 4,821,037 | 4/1989 | Miller et al. ........................... 342/383 |
| 4,935,616 | 6/1990 | Scott . |
| 5,376,938 | 12/1994 | Martinez et al. ....................... 342/128 |

OTHER PUBLICATIONS

"Characterization of a Scannerless LADAR System", Phil Garcia et al, SPIE vol. 1936 Applied Laser Radar Technology (1993), pp. 23–30.

"Non–scanned LADAR Imaging and Applications", John P. Anthes et al, SPIE vol. 1936 Applied Laser Radar Technology (1993), pp. 11–22.

"Short Range Target Detection Using A Modulated CW Laser Diode", William C. Ruff, Thesis submitted to the Faculty of the Graduate School of the University of Maryland in partial fulfillment of the requirements for the degree of Master of Science, 1991.

"A Practical Low–Cost High–Range–Resolution Ladar", Barry L. Stann, William C. Ruff and Zoltan G. Sztankay, Department of the Army, Army Research Laboratory, Adelphi, Maryland.

*Primary Examiner*—Stephen C. Buczinski
*Attorney, Agent, or Firm*—Freda L. Krosnick; Frank J. Dynda

[57] ABSTRACT

In a high range resolution ladar, a chirp signal waveform is propagated as a divergent laser light waveform and the target reflected return is collected and converted to a current proportional to power. An undelayed chirp signal is added in a mixer to the return current and then low pass filtered to recover a mixed intermediate frequency (IF) signal having a frequency proportional to the target range. Periodically, the light circuit is interrupted and the chirp signal is processed through the mixer and low pass filter without a target return current and this output, the mixer self-clutter, is stored. This stored self-clutter signal is subsequently subtracted from the mixed IF signal on a chirp by chirp basis to cancel the self-clutter produced by the mixer. The subtracted signal is then frequency analyzed to determine target range.

15 Claims, 9 Drawing Sheets

HIGH RANGE RESOLUTION LADAR

FIELD OF THE INVENTION

This invention relates to laser detection and ranging (ladar) systems generally; and, more particularly, to an incoherent ladar that achieves high range resolution through FM/CW radar ranging techniques and eliminates false targets by employing self-clutter cancellation.

BACKGROUND OF THE INVENTION

LADAR (Lasar detection and ranging) is simply radar transformed from measuring reflected radio frequency electromagnetic radiation, typically in the 1–25 cm wavelength range, to locate spatially removed objects, to a system that operates on laser radiation, typically in the 0.1 to 10.0 μm range. The resulting combination of radar and optics provides a system with inherently enhanced accuracy in the measurement of range, velocity and angular displacement, and improved countermeasure resistance. Moreover, the high carrier frequency allows ladar systems to be made more compact in physical dimension, which is particularly attractive in aircraft, projectile, space and other volume-limited applications.

Disadvantageously, the penetrating ability of optical radiation is severely degraded by weather-related atmosphere disturbances. Consequently, the major developments in ladar technology have been directed at range-finding capabilities, particularly as fire control for mobile and air defense weapon systems and as a proximity fuzing device.

Until the recent advances in high-powered low-cost rugged continuous-wave (CW) semi-conductor lasers, most systems were based on pulsed solid state lasers that operated in a very low ($\leq 1.06$ μm) wavelength range, both hazardous to eyesight and ill-suited to the modulation techniques and processors required to achieve high range resolution (i.e., less than 30 cm) without resorting to non-linear superresolution techniques and the attendant multiple target situation problems.

Moreover, self-clutter, a form of noise inherent to most FM equipment configurations, caused by irregularities and imperfections in mixer construction, produces a distorting signal frequently exceeding target signal by several orders of magnitude, consequently obscuring or confusing output target information. Comb filters have been developed to perform clutter subtraction but require a relatively substantial period of calibration or stabilization and, more importantly, are effective only with respect to time-varying or scanning applications and fail when applied to a stationary beam.

SUMMARY OF THE INVENTION

It is therefore an object of the present invention to provide an incoherent ladar system capable of high range resolution and multiple target detection.

It is another object of the present invention to achieve unambiguous high range resolution using frequency modulation (FM) radar techniques that involves frequency modulation of a radio frequency subcarrier to amplitude modulate the light output of a semi-conductor laser.

It is also an object of the present invention to provide a self-clutter cancellation technique for incoherent ladar systems effective in both time-varying and stationary beam applications.

It is a further object of the present invention to capitalize on readily available and inexpensive continuous wave semiconductor laser diodes to produce improved ruggedness and reliability at a reduced cost in a high range resolution ladar system.

Another object of the present invention is to produce a ladar system having an improved signal to noise ratio and resolution than achieved by pulse based ladars.

Yet another object of the present invention is to provide a technique for removing false targets created by self-clutter typical of FM/CW ranging techniques.

The aforesaid objects can be achieved individually and in combination and it is not intended that the invention be construed as requiring that two or more of said objects be combined.

In accordance with the present invention, the laser transmitter of a ladar system is amplitude modulated with a radio-frequency subcarrier and the subcarrier is frequency modulated. The target-reflected light is incoherently detected with a photodiode and converted into a voltage waveform. This waveform is then mixed with an undelayed sample of the original transmitted waveform. The mixed output signal is processed to remove self-clutter commonly generated in frequency modulated ranging systems. The clutter free waveform is then processed coherently to recover target range data.

The above and still further objects, features and advantages of the present invention will become apparent upon considering the following detailed description of specific embodiments thereof, particularly when viewed in conjunction with the accompanying drawings wherein like reference numerals in the various figures are utilized to designate like components.

DESCRIPTIONS OF THE PREFERRED EMBODIMENTS

Figure 1:
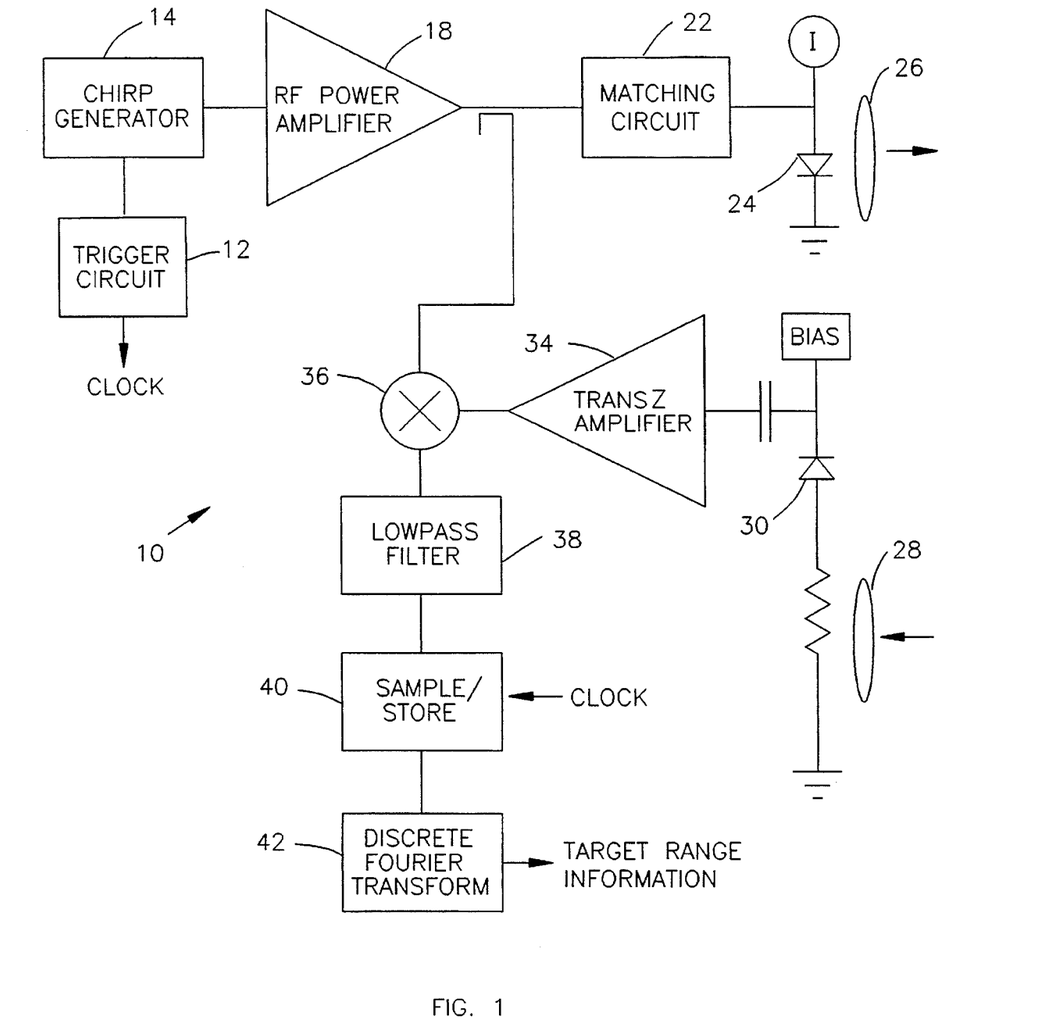
FIG. 1 is a block diagram of a ladar architecture.

The basic architecture of ladar 10 is represented in the block diagram of FIG. 1. A trigger circuit 12 activates a chirp generator 14 producing a signal with a frequency that increases linearly as a function of time over period, T. Other modulation waveforms are usable for this architecture; this one is chosen because the signal processing required to form range gates is readily understood, and the processor is relatively low bandwidth which makes it easy to implement. Various commercial devices are available for generating the chirp signal. For short-range, high resolution applications, commercial oscillators using monolithic microwave integrated circuits (MMICs) or hybrid technologies are usable. For long-range, high-resolution applications, precision linear tuning characteristics are required, which means that YIG-tuned oscillators or direct digital frequency synthesis devices are necessary. For applications where precision oscillators are not affordable, but tuning precision is still required, additional hardware may be built into the ladar that continuously measures the chirp-tuning characteristics. With this information, appropriate compensation techniques can be applied that effectively back-out the tuning non-linearities.

For the architecture discussed here the start frequency of the chirp signal is typically in the tens to low hundreds of megahertz and the stop frequency in the hundreds of megahertz to low gigahertz. The difference between the start and stop frequencies, $\Delta F$, is chosen to establish the sensor resolution, $\Delta R$, according to the following equation:

$$\Delta R = c/(2\Delta F) \tag{1}$$

where $\Delta R$ is the desired range resolution, c is the velocity of light and $\Delta F$ is the difference between the start and stop frequencies.

The chirp signal is fed through a wideband RF power amplifier 18 to a matching circuit 22 that matches the driving impedance of the amplifier to the impedance of a laser diode 24 over the range of $\Delta F$. The light beam intensity remains highly modulated over the chirp bandwidth and consequently the peak intensity is constant as a function of chirp frequency. Commercially available laser diodes having 2 GHz modulation bandwidths and output powers to 4 W will support embodiment of the present invention with resolutions less than 0.3 m and ranges to several kilometers.

Laser diode 24 converts the chirp current waveform into a light waveform with power proportional to the driving current. This divergent laser light beam is collected by a first lens 26, collimated and directed toward a target. The small portion of transmitted light that is reflected by the target and propagated back to the ladar is collected by a second lens 28 and focused onto the active detection region of a photodiode 30. Photodiode 30 converts the collected incident received light power into a current waveform with amplitude proportional to the light power, thus recovering a current waveform identical to the original modulating waveform except for an amplitude reduction and time delay equal to the propagation time from the sensor to the target and return. Output current from photodiode 30 is converted into a voltage waveform by a wideband trans-impedance amplifier 34. The amplified voltage waveform is fed into a mixer 36 along with an undelayed sample of the original transmitted chirp waveform. The mixer output is fed into lowpass filter 38 to recover an intermediate frequency (IF) signal. This is followed by a sample-and-store memory circuit 40. The mean frequency of the IF signal, $f_{if}$, is given by $$f_{if} = \Delta F \frac{\tau}{T} \tag{2}$$

wherein $\tau$ is the round-trip time delay for the transmitted signal. This equation follows from standard FM radar ranging theory. The expression for $\tau$ is $$\tau = 2(D/c) \tag{3}$$

where D is the distance from the sensor to the target. Substituting this expression into the equation for $f_{if}$ yields, $$f_{if} = 2\Delta F(D/cT) \tag{4}$$

which shows that the frequency of the IF waveform is directly proportional to the range to the target. The range to the target is then determined by measuring the frequency of the IF waveform using a discrete Fourier transform circuit 42 or some other technique.

Mathematically, the frequency of the transmitted chirp waveform can be expressed as, $$f(t) = f_0 + (\Delta F/T) \cdot t \quad -\frac{T}{2} \leq t \leq \frac{T}{2} \tag{5}$$

where $f_0$ is the center or carrier frequency of the chirp waveform. The phase of the transmitted chirp waveform is $$\phi_x(t) = \int_{-\infty}^{t} 2\pi(f_0 + (\Delta F/T) \cdot t')dt' \tag{6}$$

while the phase of the received signal is, $$\phi_r(t) = \int_{-\infty}^{(t-\tau)} 2\pi(f_0 + (\Delta F/T) \cdot t')dt' \tag{7}$$

The phase difference between the transmitted received signals is $$\Delta\phi(t) = \phi_x(t) - \phi_r(t) \tag{8}$$

or $$\Delta\phi(t) = \int_{t-\tau}^{t} 2\pi(f_0 + (\Delta F/T) \cdot t')dt' \tag{9}$$

Performing the integration and inserting the limits yields, $$\Delta\phi(t) = 2\pi\left(f_0 t + \left(\frac{\Delta F}{2T}\right)t^2\right) - \tag{10}$$
$$2\pi\left(f_0(t-\tau) + \left(\frac{\Delta F}{2T}\right)(t^2 - 2t\tau + \tau^2)\right)$$

Canceling terms and dropping the $\tau^2$ term because $\tau$ is set much less than T leaves $$\Delta\phi(t) = 2\pi f_0 \tau + 2\pi\left(\frac{\Delta F}{2T}\right)\tau t \tag{11}$$

The mixer and following filtering process yields the IF waveform, $$V_m(t) = \alpha_r \cos(\Delta\phi(t)) \tag{12}$$

or $$V_m(t) = a_r \cos 2\pi\left(f_0 \tau + \left(\frac{\Delta F}{T}\right)\tau t\right) \tag{13}$$

where $a_r$ represents the amplitude of the received signal after considering all propagation, scattering, detection, and mixing losses and amplifier gains.

The IF waveform is a cosine function whose argument contains two terms. The first is recognized as a fixed Doppler phase term which is proportional to the carrier frequency and time delay or distance to the target. The second term is a function of time and contains the frequency of $V_m(t)$, $(\Delta F/T)\tau$, which is proportional to $\tau$ or distance to the target. A plot of this function shown in FIG. 2 as a function of normalized range, $\tau\Delta F$, and normalized t illustrates this behavior. Here the shading represents variations in the function with the dark regions representing the minimum of $V_m(t)$ and the bright regions representing the maximums. A typical IF target signal taken through the three-dimensional plot of FIG. 2 at a normalized range of 5.0 is shown in FIG. 3. The important feature to notice is that the number of periods observed over normalized time or one sweep of the modulation increases proportionally with the normalized range. From this, it follows that the target distance can be determined simply by measuring the frequency of $V_m(t)$ over T. The usual method for determining the frequency content of a waveform requires computing the Fourier transform of the waveform, $$F(f) = \frac{a_r}{T} \int_{-\frac{T}{2}}^{\frac{T}{2}} \cos 2\pi \left( f_0\tau + \left( \frac{\Delta F}{T} \right)\tau t \right) \cdot e^{-j2\pi ft} dt \quad (14)$$

Performing the integration yields, $$F(f) = e^{j2\pi f_0\tau} \cdot \frac{\sin\left( \pi \left( \Delta F \frac{\tau}{T} - f \right) T \right)}{\left( \pi \left( \Delta F \frac{\tau}{T} - f \right) T \right)} + e^{(-j)2\pi f_0\tau} \cdot \frac{\sin\left( \pi \left( \Delta F \frac{\tau}{T} + f \right) T \right)}{\left( \pi \left( \Delta F \frac{\tau}{T} + f \right) T \right)} \quad (15)$$

where the term $a_r$ which modifies the entire equation has been dropped to effectively normalize the amplitude of the ladar response to a target. For the ladar architecture of the present invention employing the discrete Fourier transform to establish range cells, each complex output sample of the transform represents the magnitude and phase of the respective harmonic frequency components of the input waveform that occur at integer multiples of 1/T. This allows f to be replaced in equation 15 with n/F yielding.

$$F(n/T) = e^{j2\pi f_0\tau} \cdot \frac{\sin(\pi(\Delta F\tau - n))}{\pi(\Delta F\tau - n)} + e^{(-j)2\pi f_0\tau} \cdot \frac{\sin\pi(\Delta F\tau + n)}{\pi(\Delta F\tau + n)} \quad (16)$$

The exponential terms in equation 16 represent the Doppler component present in each harmonic line while the sin(x)/x term represents the amplitude of the Doppler component. For n greater than three or four, the second major term can be ignored because it is smaller than the first. Examining the first major term shows that each harmonic component of F(n/T) has a maximum for $$\Delta F\tau = n \quad (17)$$

which means that the output samples of the discrete Fourier transform have been mapped to normalized range according to equation 17. Equivalently each output sample corresponds to a range-gate.

Figure 4:
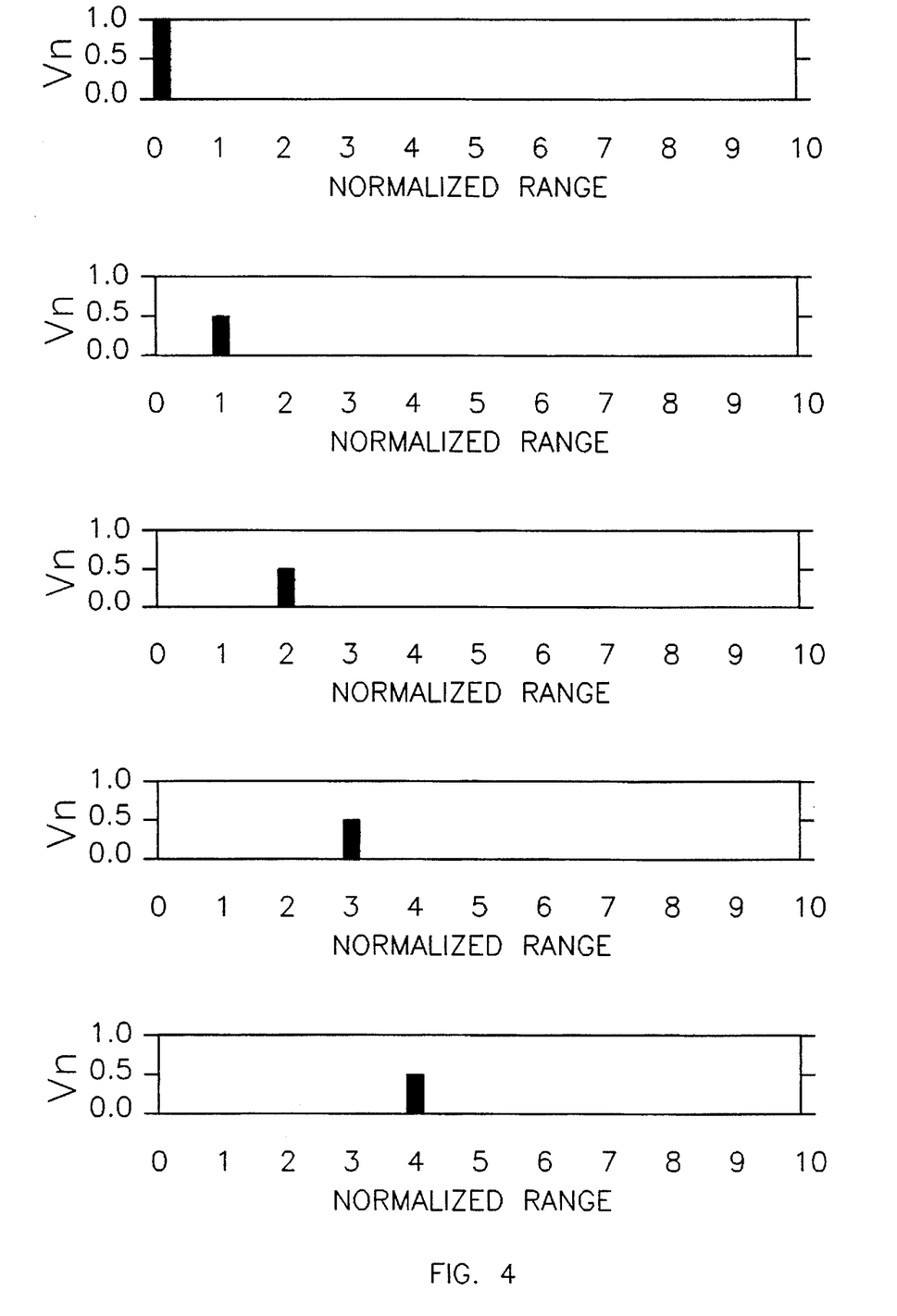
FIG. 4 is a series of plots of processor output as a function of normalized target range for a series of targets positioned at increasing normalized range.

FIG. 4 shows a series of plots of the magnitude of equation 16 as a function of n for targets positioned at increasing normalized range. As an example, the top plot shows the magnitude of equation 16 for a target positioned at a normalized range of zero. As expected the target signal appears in the first harmonic line (first range-gate) which corresponds to a normalized range of zero. For plots below the top one, the normalized range of the target is successively increased by one and the indicated position of the target correspondingly increases.

Figure 5:
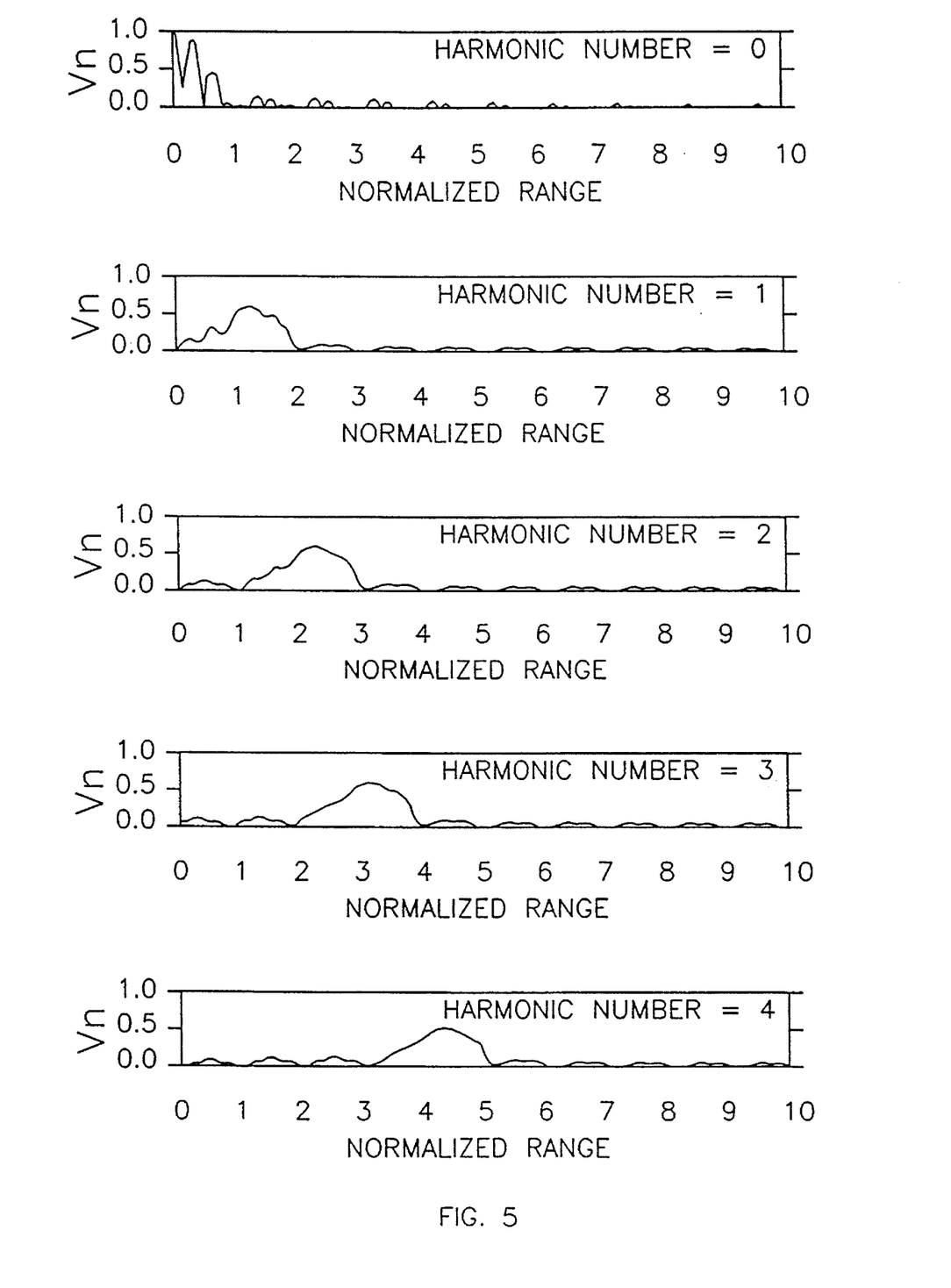
FIG. 5 is a series of plots of range-gate output, or range responses, as a function of normalized target range for a series of range gates positioned at increasing normalized range.

FIG. 5 shows how the individual harmonic lines or range-gates of equation 16 behave as the normalized target range moves from 0 to 10. These plots are called range responses. For instance the top plot shows the magnitude of the first range-gate (harmonic number=0) as a function of target range. As expected the magnitude of this range-gate is maximum at zero range and decreases with increasing range. The rapid modulation in the basic (sin x)x shape of the function is caused by the second major term in equation 16 that is still strong at small n. For plots successively below the top plot, the harmonic number is increased by one. As expected the peak of the range response moves out in range one-for-one with increasing harmonic number. Also noted is the fact that the shape of each response becomes more (sin x)x in shape as n increases.

The notion of range resolution can now be established from one of the higher harmonic number range responses. From these responses, the normalized distance between the 0.64 levels of the mainlobe of the range response is equal to 1, which means that $$\Delta F\Delta\tau = 1 \quad (18)$$

Setting the resolution, $\Delta R = c((\Delta\tau)/2)$ and substituting into equation 18 yields $$\Delta R = c/(2\Delta F) \quad (19)$$

A practical implementation of this ladar system will have a substantial "self-clutter signal" present at the mixer output that will induce false targets in the range gates. This signal is usually caused by small imperfections in the construction of balanced mixers that, in effect, cause a detected portion of the local oscillator voltage to appear at the IF output port. Another common cause of self-clutter is the leakage of a small fraction of the local oscillator power to the receive port and hence toward the first microwave device in the receive path. The signal is reflected and then mixed to create a self-clutter signal. This signal is usually different from unit to unit, but is periodic with the chirp and is relatively constant over many chirp periods. An example of such a self-clutter signal over a normalized modulation period is shown in FIG. 6 and the linear addition of this self-clutter signal with the generally cosine waveform of the received IF signals, typified by FIG. 3, creates a confused hybrid signal, represented in FIG. 7.

Figure 2:
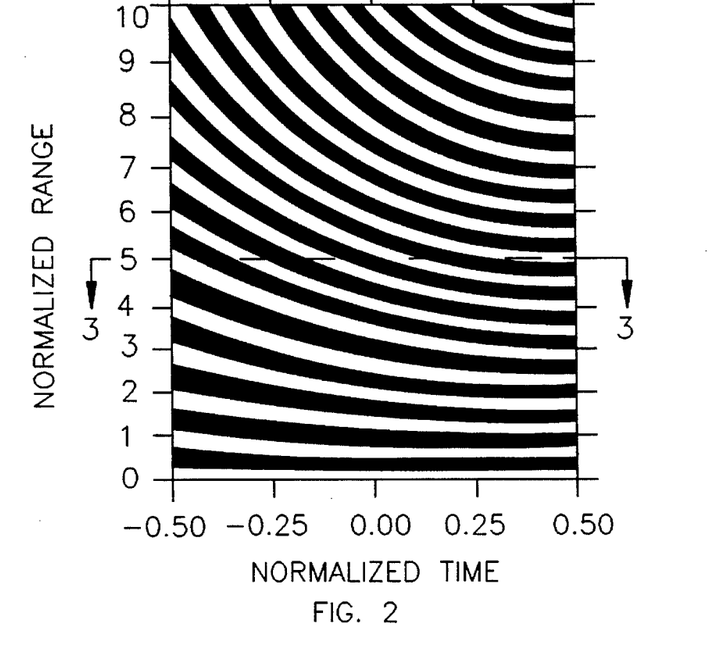
FIG. 2 is a three-dimensional representation of the mixer/low pass filter output as a function of normalized range and normalized time.
Figure 3:
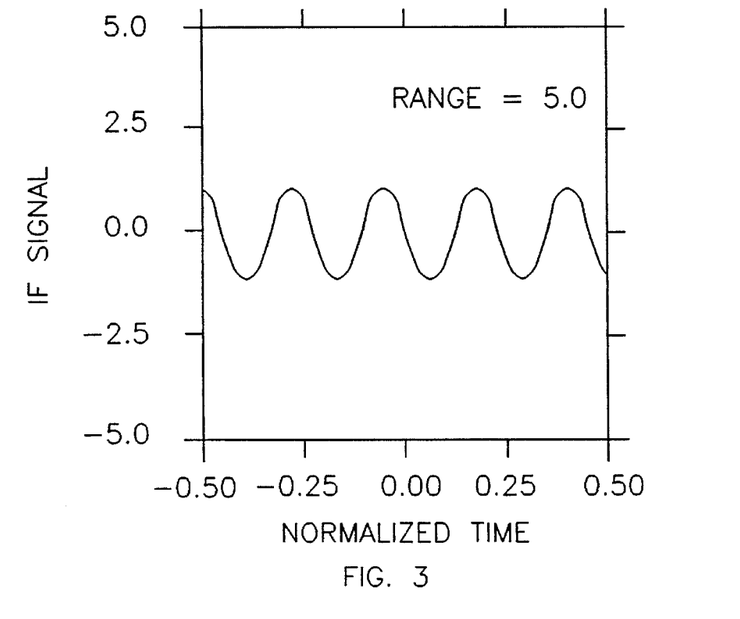
FIG. 3 is a two-dimensional plot of a typical IF target signal taken through a normalized range equal to 5.0 on FIG. 2.
Figure 6:
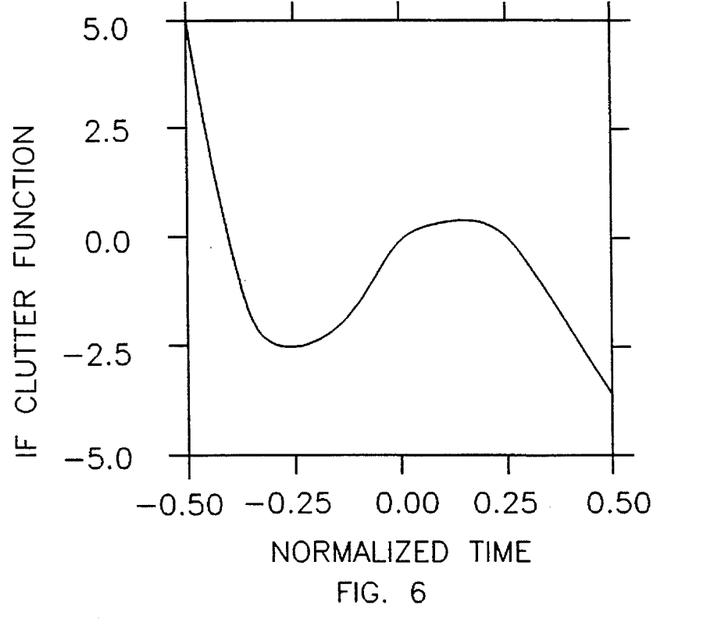
FIG. 6 is a plot of a representative self-clutter signal as a function of a normalized modulation period.
Figure 7:
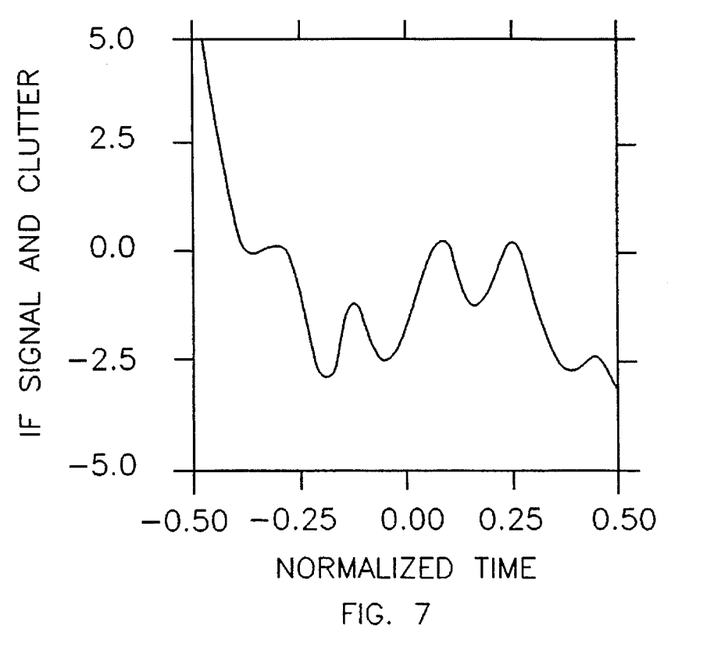
FIG. 7 is a plot of a representative IF signal superimposed on the self-clutter signal of FIG. 6.
Figure 8:
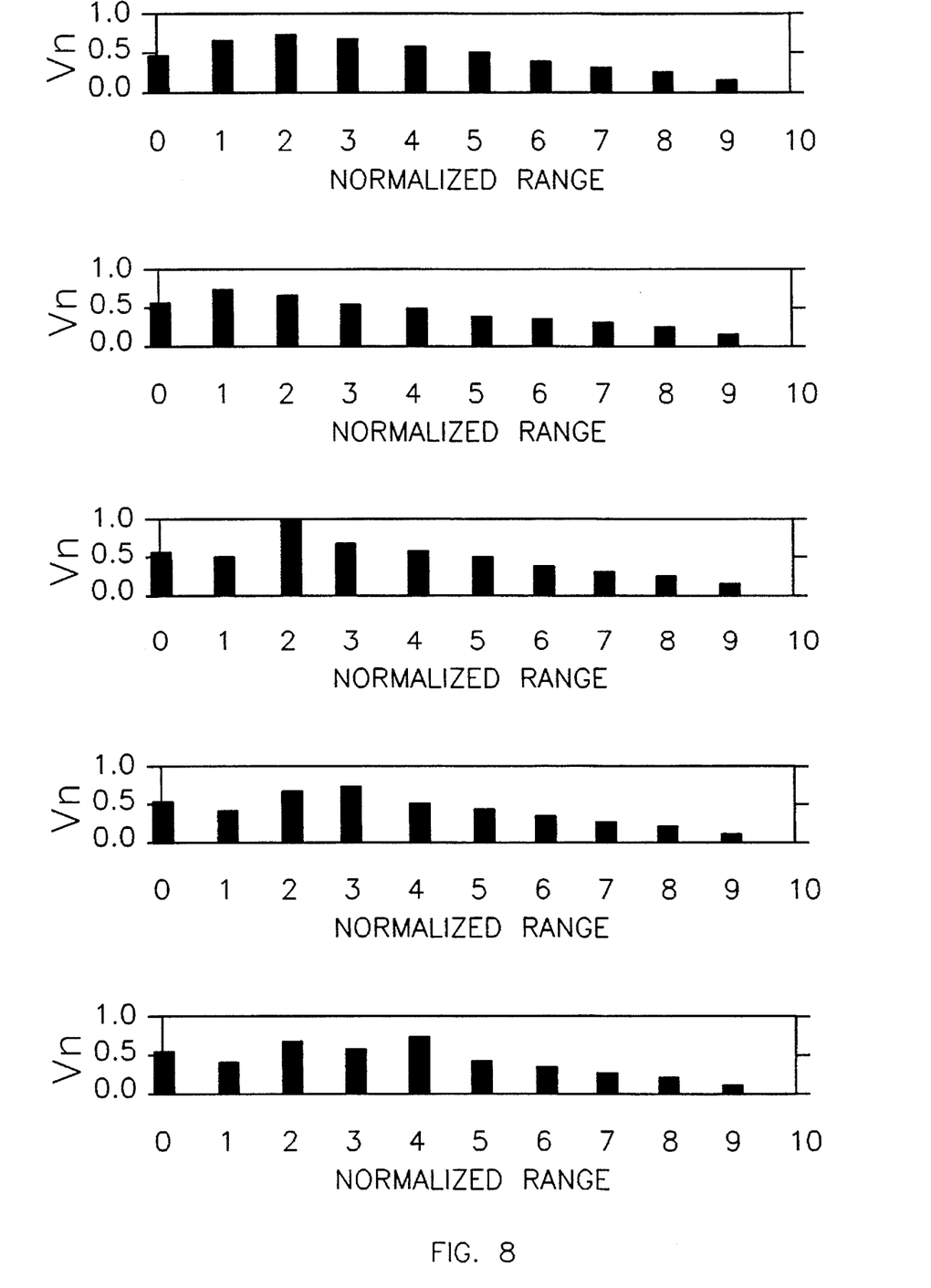
FIG. 8 is a series of plots of discrete Fourier transform (DFT) range gate processor output resulting from the superposition of the self-clutter signal of FIG. 6 on the IF signal of FIG. 2.

To illustrate the problems induced by the self-clutter, the signal in FIG. 6 was added to the IF signal in FIG. 2 and the total signal range-gate processed using the discrete Fourier transform. The results displayed in FIG. 8 show the presence of numerous false targets that are indistinguishable from the actual ones that were clearly identifiable in FIG. 4 where no self-clutter was present.

Figure 9:
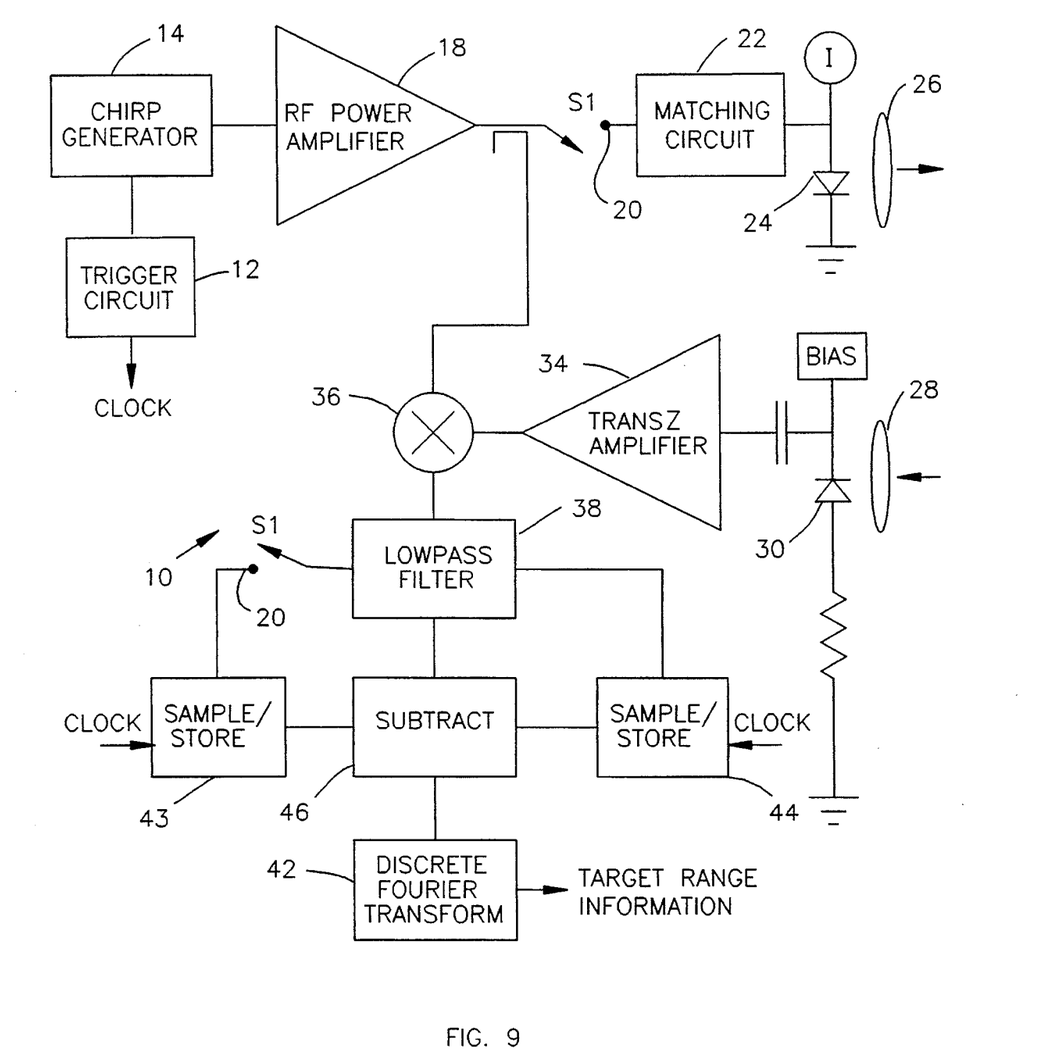
FIG. 9 is a block diagram of the high range resolution ladar with self-clutter cancellation circuitry according to the present invention.
Figure 10:
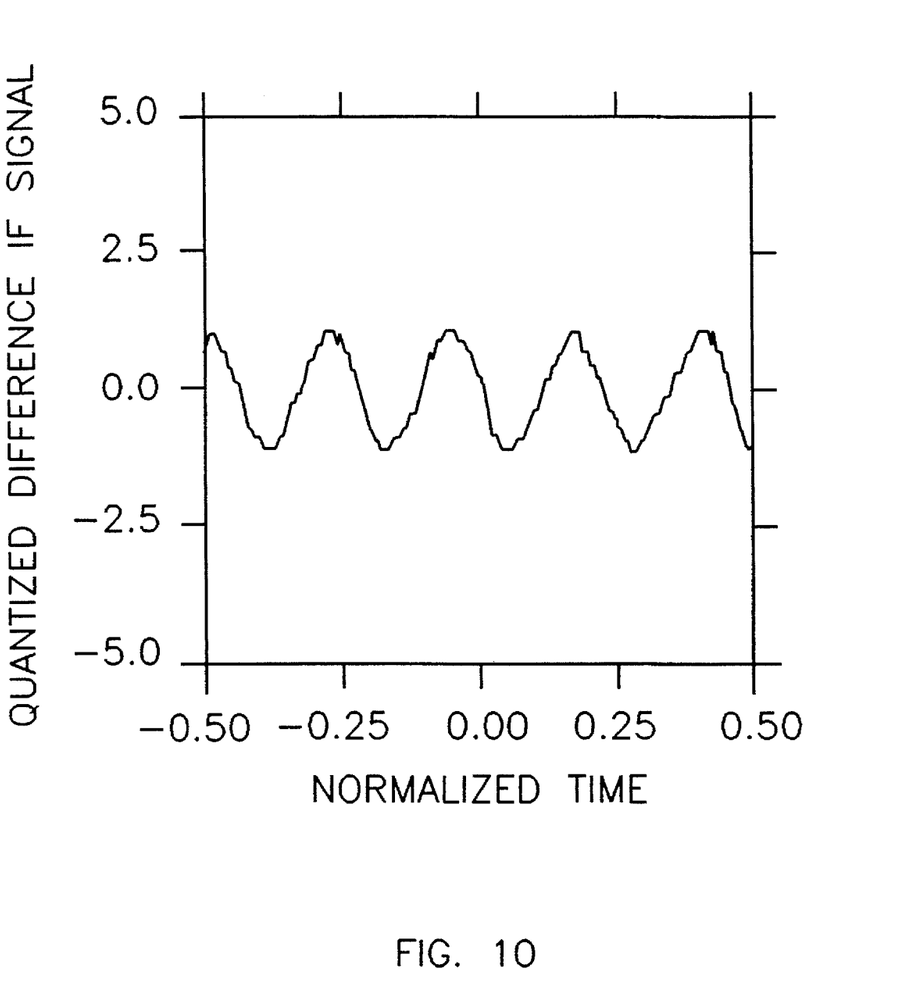
FIG. 10 is a plot of a typical digitized IF target signal after self-clutter subtraction.
Figure 11:
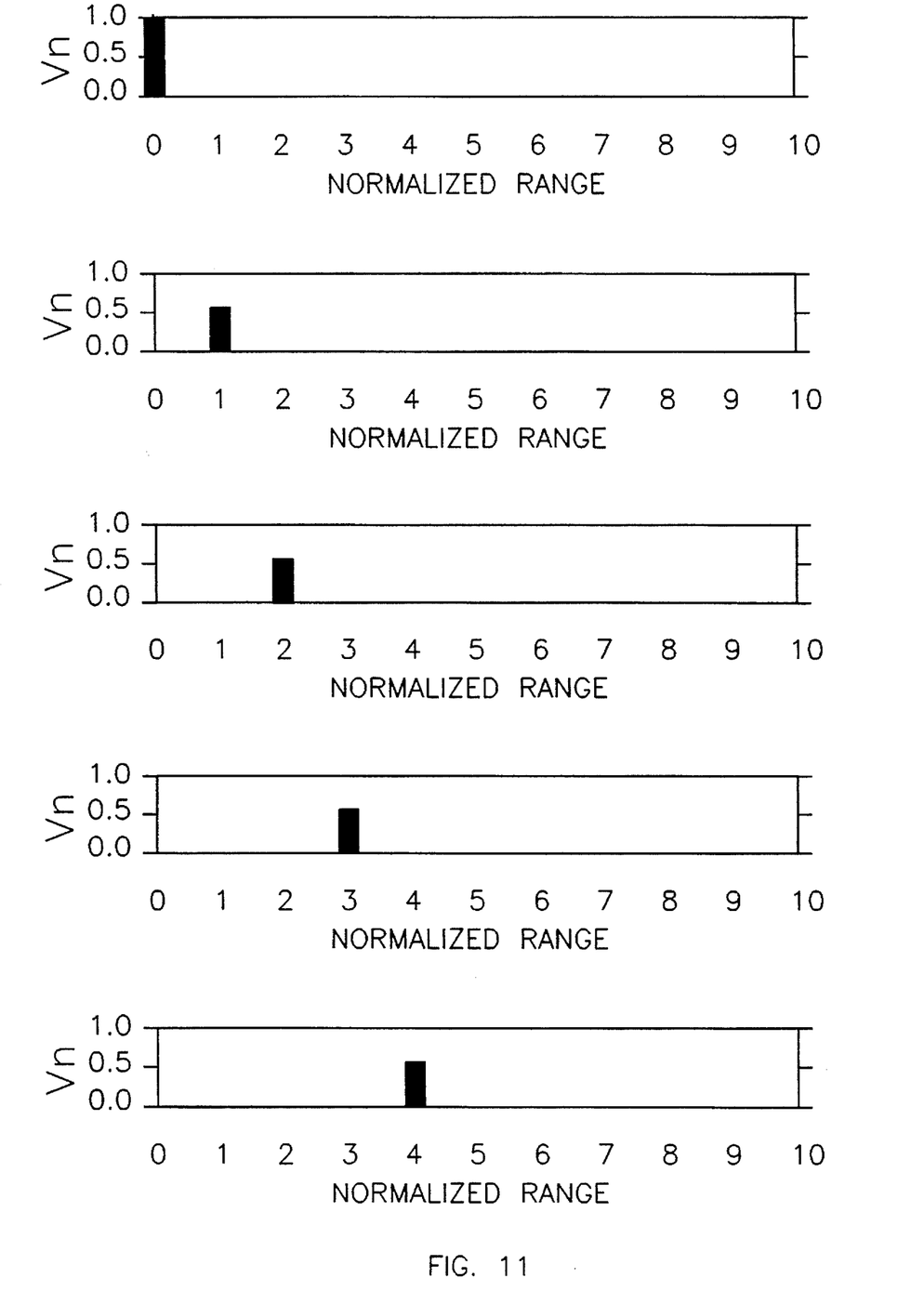
FIG. 11 is a series of plots of the discrete DFT range gate processor output of FIG. 8 after self-clutter cancellation, according to the present invention.

A subtraction technique, implementable with modern analog-to-digital converters, memory chips and microwave switches eliminates the self-clutter problem in the present invention. Referring to the block diagram of FIG. 9, a first switch 20 is opened to interrupt the transmission of light to the target, therefore leaving only the self-clutter signal present at the lowpass filter output. A second switch 21 connects lowpass filter 38 to a first sample-and-store memory circuit 43. When second switch 21 is closed, the clutter signal is directed into first sample-and-store memory circuit 43. For subsequent chirp periods, first switch 20 is closed and second switch 21 is open. The total IF signal is then sampled and stored in a second sample-and-stored memory circuit 44. The clutter signal from first sample-and-store memory circuit 43 and the total IF signal from second sample-and-store memory circuit 44 are simultaneously fed into a subtracting circuit 46 where the self-clutter signal is subtracted from the total IF signal on a chirp by chirp basis leaving only the IF signal, shown in FIG. 10. The differential output is fed into Fourier transform circuitry 42 to map the received time domain IF signal into the frequency domain or, equivalently, the range domain, to indicate distance to the target. A plot of these results, shown in FIG. 11, demonstrates the effect of self-clutter subtraction on the potential false target rate compared to the uncorrected outputs of FIG. 8. The updating rate of the stored self-clutter signal is based on the rate of change of the self-clutter signal and the degree of cancellation required to meet ladar sensitivity requirements. In other words, the reversals of switches 20 and 21 can be performed as often as required to assure that the self-clutter signal in first sample-and-store memory circuit 43 is constantly updated to reflect current conditions. As indicated earlier, the self-clutter signal is usually fairly unvarying but the capability to check and update provides added reliability. Self-clutter signals as high as 60 dB above the target signal can be successfully subtracted according to the technique of the present invention using 12-bit analog-to-digital converters.

From the foregoing description, it will be appreciated that the present invention provides an incoherent ladar able to attain high range resolution using FM radar ranging techniques and a unique self-clutter cancellation process.

Many other signal processing techniques used in FM radar can also be exploited in the present invention to handle problems unique to any real ladar application. Some of the common techniques include the use of alternate modulation waveforms (triangle waves, pseudo-random codes, etc.) to simplify the formation of range cells or inhibit the detection of jamming signals or other operating sensors, the application of weighting on the IF waveform to reduce range side-lobes, IF amplifier limiting to effectively normalize the range response to any target return amplitude, the addition of "gates" to inhibit the detection of clutter and aerosols, Doppler detection to determine target velocity, and methods to determine whether a target is approaching or receding.

The elimination, or substantial reduction, of self-clutter from low cost high range resolution ladars provided by the present invention supports the application of such radars in collision avoidance systems for cars, helicopters and the like as well as for battlefield applications such as target acquisition, remote sensing, fuzing, robotics and armor protection systems.

Having described preferred embodiments of a new and improved method and apparatus for successfully achieving high range resolution by combining incoherent detection with FM radar ranging techniques and a self-clutter cancellation technique, it is believed that other modifications, variations and changes will be suggested to persons skilled in the art after having access to the teachings set forth herein. It is therefore to be understood that all such variations, modifications and changes are believed to fall within the scope of the present invention as defined by the appended claims.

What is claimed is:

1. A self-clutter cancelling high resolution incoherent ladar comprising:

a source of driving current;

first generating means for generating a light signal having power proportional to said driving current;

second generating means for generating a frequency modulated modulation signal;

modulating means for amplitude modulating said light signal with said modulation signal;

transmitter means for collimating and directing said light signal toward a target;

receiver means for collecting light signals reflected from said target;

conversion means for converting said collected light signals into a reflected current signal proportional to power of the collected light signals;

mixer means for mixing said modulation signal, undelayed by transmission and reflection, with said reflected current signal to provide a mixer output intermediate frequency (IF) signal having a mean frequency proportional to the range of said target;

a first means for sampling-and-storing said mixer output signal;

a second means for sampling-and-storing said mixer output signal;

interruption means for selectively interrupting amplitude modulation of said driving current by said modulation signal to permit only said undelayed modulation signal to be processed by said mixer means and provide a self-clutter signal representing clutter introduced in said mixer;

first directing means for directing said self-clutter signal to said first sampling and storing means when amplitude modulation of said driving current is interrupted;

second directing means for directing said mixer output signal to said second sampling and storing means when amplitude modulation of said driving current is uninterrupted;

subtracting means for subtracting said self-clutter signal stored in said first sampling and storing means from said mixer output signal stored in said second sampling and storing means on a period by period basis to provide a subtracted signal; and analyzing means for frequency analyzing said subtracted signal to determine distance of said second target from the ladar.

2. The self-clutter cancelling ladar of claim 1 wherein said second generating means generates a signal having a frequency of modulation varying linearly as a function of time over a predetermined time.

3. The self-clutter cancelling ladar of claim 1 wherein said means for generating said light signal is a semi-conductor laser diode.

4. The self-clutter cancelling ladar of claim 1 wherein said means for generating said light signal is a GaAs laser diode having a modulation bandwidth of between 1 and 3 GHz and an output power of between 3 mW and 5 W.

5. The self-clutter cancelling ladar of claim 1 wherein said means for frequency analyzing said subtracted signal is a discrete Fourier transform circuit.

6. The self-clutter cancelling ladar of claim 1 wherein said interruption means is selectively actuable to periodically update said stored self-clutter signal.

7. In an incoherent laser radar system of the type in which a modulation signal is used to control transmitted laser light, a portion of said transmitted light is reflected back to the system by a target and incoherently detected to provide a delayed signal, and the delayed incoherently detected signal is mixed in a signal mixer with the undelayed modulation signal to provide a mixed signal that is processed to provide a processed mixed signal and frequency analyzed to determine target range, the improvement comprising:

(a) means for selectively interrupting transmission of light to the target;

(b) means for processing said undelayed modulation signal through the mixer while said light transmission is interrupted, and storing the result as a self-clutter signal; and (c) means for subtracting said self-clutter signal on a period by period basis from said processed mixed signal.

8. The incoherent laser system of claim 7 wherein the transmitted laser light is amplitude modulated with a radio frequency subcarrier, and said subcarrier is frequency modulated.

9. The incoherent laser system of claim 8 wherein said modulation signal is a frequency modulated signal wherein said frequency increases linearly as a function of time over a predetermined time.

10. The incoherent ladar system of claim 7 wherein a discrete Fourier transform circuit is used to frequency analyze said mixed signal.

11. The incoherent ladar system of claim 7 further comprising means for periodically interrupting said transmission of light to the target and processing said undelayed signal to update said self-clutter signal.

12. A method for cancelling self-clutter generated in processing ladar target return signals mixed with undelayed frequency modulated signals used to amplitude modulate light transmitted to the target, said method comprising the steps of:

(a) selectively processing only the undelayed frequency modulation signal to produce a self-clutter signal;

(b) storing said self-clutter signal;

(c) subtracting said stored self-clutter signal from subsequent processed return mixed signals to provide a subtracted signal.

13. The method of claim 12 wherein said frequency modulated signals used to amplitude modulate light transmitted to the target vary linearly as a function of time over a predetermined time.

14. The method of claim 12 further comprising the step of:

(d) frequency analyzing said subtracted signal to determine target range.

15. The method of claim 14 wherein said frequency analyzing is performed by a discrete Fourier transform circuit.

* * * * *